UNITED STATES PATENT OFFICE.

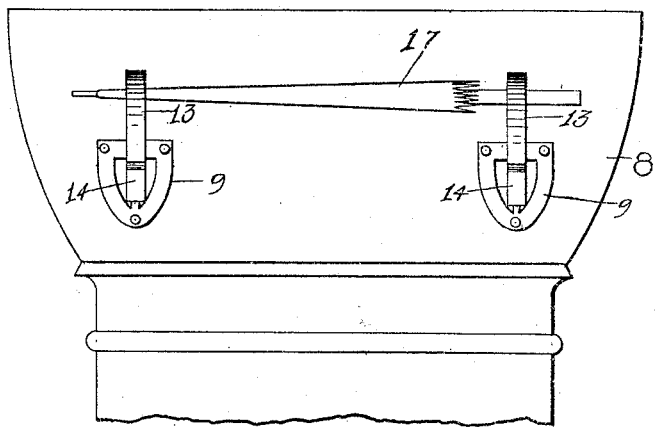
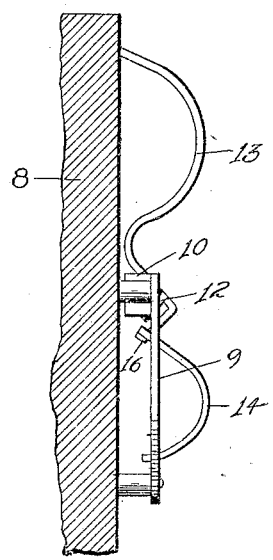
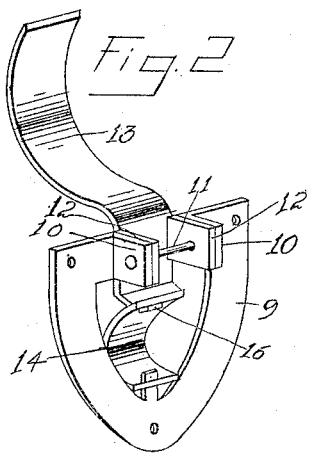
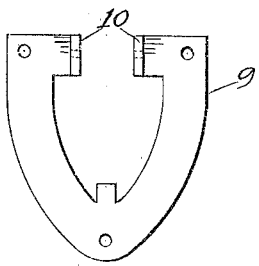
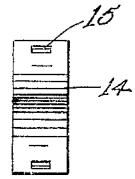
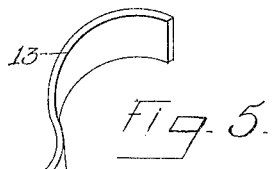

SADIE A. REITHMILLER, OF SMICKSBURG, PENNSYLVANIA.

UMBRELLA-HOLDER.

959,072.  Specification of Letters Patent.  Patented May 24, 1910.

Application filed August 23, 1909. Serial No. 514,207.

*To all whom it may concern:*

Be it known that I, SADIE A. REITHMILLER, a citizen of the United States, residing at Smicksburg, in the county of Indiana, State of Pennsylvania, have invented certain new and useful Improvements in Umbrella-Holders; and I do hereby declare the following to be a full, clear, and exact description of the invention, such as will enable others skilled in the art to which it appertains to make and use the same.

The invention relates to an umbrella holder and more particularly to the class of devices for holding umbrellas in vehicles.

The primary object of the invention is the provision of a device in which an umbrella when folded may be conveniently held upon the back of the seat of a vehicle so as not to be in the way of an occupant yet enabling ready access to be had to the umbrella in event that it is desired to use the same.

Another object of the invention is the provision of a device of this character which is simple in construction, thoroughly reliable and efficient in operation, and inexpensive in the manufacture.

With these and other objects in view, the invention consists in the construction, combination and arrangement of parts as will be hereinafter more fully described in detail, illustrated in the accompanying drawings, which disclose the preferred form of embodiment of the invention, to enable those skilled in the art to practice the same and as pointed out in the claim hereunto appended.

In the drawings:—Figure 1 is a fragmentary rear elevation of a vehicle seat with the invention applied thereto and supporting a folded umbrella. Fig. 2 is a detail perspective view of one of the holding devices removed from the vehicle seat. Fig. 3 is a plan view of the main supporting plate of the device. Fig. 4 is a detail view of the locking jaw detached from the device. Fig. 5 is a plan view of the spring member. Fig. 6 is a fragmentary sectional view showing one device in side elevation.

Similar reference characters indicate corresponding parts throughout the several views in the drawings.

In the drawings, the numeral 8 designates generally a vehicle seat which is of the ordinary or well known construction and has mounted at any suitable locality upon its back portion an umbrella holding device comprising a pair of base or supporting plates 9, securing in spaced alining relation to each other upon the back portion of the seat 8, by any suitable fasteners. Each of said supporting plates 9, has formed integral therewith spaced parallel ears 10, projecting inwardly at right angles from said plate and in which is mounted a pivot pin 11, the latter being passed through spaced parallel ears 12, bent from a curved locking jaw 13, so that said pivot pin 11 forms a hinged connection for the locking jaw.

Engaging by a suitable fastener in the supporting plate 9, is one end of a flat bowed spring 14, the latter being provided near its opposite end with a suitable slot 15, engaging a lip or tongue 16, formed on the locking jaw 13, and this spring 14, serves to normally hold the locking jaw 13 in closed position so as to clamp and support an umbrella 17, when folded. It being understood of course that it is necessary to employ or provide a pair of these supporting plates 9, with the hinged locking jaws connected thereto for properly holding the umbrella 17, when folded and in disuse.

From the foregoing the construction and operation of the invention will be clearly apparent without the necessity of a more extended explanation and therefore the same has been omitted.

What is claimed is:—

In a device of the class described, a substantially V-shaped base plate having spaced parallel ears at its terminals, a curved jaw pivoted near one end between the ears and having an inturned extension provided with a tongue, a tongue projecting from the inner edge of the base plate at the crotch thereof, and a normally bowed spring connected at opposite ends to the said tongues to normally hold the jaw in closed position relative to the base plate.

In testimony whereof, I affix my signature, in presence of two witnesses.

SADIE A. REITHMILLER.

Witnesses:
 A. E. REITHMILLER,
 MINNIE CASEDY.